(12) United States Patent
Yamamoto et al.

(10) Patent No.: US 9,822,029 B2
(45) Date of Patent: Nov. 21, 2017

(54) METHOD FOR PROCESSING BRITTLE PLATE, AND DEVICE FOR PROCESSING BRITTLE PLATE

(71) Applicant: Asahi Glass Company, Limited, Chiyoda-ku (JP)

(72) Inventors: Takashi Yamamoto, Chiyoda-ku (JP); Toshiyuki Ishibashi, Chiyoda-ku (JP); Mitsuhiko Endo, Chiyoda-ku (JP); Masashi Kasajima, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/181,599

(22) Filed: Jun. 14, 2016

(65) Prior Publication Data

US 2016/0280579 A1   Sep. 29, 2016

Related U.S. Application Data

(63) Continuation of application No. PCT/JP2014/083158, filed on Dec. 15, 2014.

(30) Foreign Application Priority Data

Dec. 27, 2013 (JP) .................. 2013-273331

(51) Int. Cl.
*B28D 1/22* (2006.01)
*C03B 33/033* (2006.01)
*B26F 3/00* (2006.01)

(52) U.S. Cl.
CPC .............. *C03B 33/033* (2013.01); *B26F 3/00* (2013.01); *B26F 3/002* (2013.01); *B28D 1/222* (2013.01)

(58) Field of Classification Search
CPC .......... C03B 33/033; B26F 3/002; B26F 3/00; B28D 1/222
(Continued)

(56) References Cited

U.S. PATENT DOCUMENTS 4,088,255 A    5/1978  DeTorre
4,948,025 A *  8/1990  Lisec .................... C03B 33/033
                                                225/104

(Continued)

FOREIGN PATENT DOCUMENTS

CN    103347828 A    10/2013
JP      3-42619 U     4/1991
(Continued)

OTHER PUBLICATIONS

International Search Report dated Jan. 20, 2015 in PCT/JP2014/083158, filed Dec. 15, 2014 (with English Translation).
(Continued)

*Primary Examiner* — Sean Michalski
(74) *Attorney, Agent, or Firm* — Oblon, McClelland, Maier & Neustadt, L.L.P.

(57) ABSTRACT

A method for processing a brittle plate includes a breaking step in which a pressing member for pressing a surface of the brittle plate and a support member for supporting a back face of the brittle plate are used to bend and deform the brittle plate and break the brittle plate along a score line formed on the surface of the brittle plate. The support member includes a flat portion that is arranged flat against one portion of the brittle plate to support the brittle plate, and a regulating portion that regulates a bending deformation shape of the brittle plate when the pressing member is pressed against a predetermined position of a remaining portion of the brittle
(Continued)

plate. The breaking step includes breaking the brittle plate along the score line that is within the remaining portion of the brittle plate.

15 Claims, 6 Drawing Sheets

(58) Field of Classification Search
USPC .................................................. 225/6, 94, 93
See application file for complete search history.

(56) References Cited

U.S. PATENT DOCUMENTS

| | | | | |
|---|---|---|---|---|
| 5,165,585 | A * | 11/1992 | Lisec | C03B 33/033 225/105 |
| 5,480,081 | A * | 1/1996 | Wilson | B28D 1/225 125/23.02 |
| 6,116,487 | A * | 9/2000 | Nagamoto | B26F 3/00 225/1 |
| 6,513,694 | B1 * | 2/2003 | Xu | B28D 5/0011 125/23.01 |
| 8,439,241 | B2 * | 5/2013 | Stangl | C03B 33/06 225/2 |
| 8,496,150 | B2 * | 7/2013 | Lee | B26D 7/1836 225/100 |
| 8,650,995 | B1 * | 2/2014 | Gillum | B26F 3/02 225/1 |
| 8,796,113 | B2 * | 8/2014 | Endo | H01L 21/78 438/460 |
| 9,130,031 | B2 * | 9/2015 | Endo | B23K 26/40 |
| 2002/0084301 | A1 * | 7/2002 | Murgatroyd | G02B 6/25 225/105 |
| 2003/0147035 | A1 * | 8/2003 | Chae | B28D 5/0011 349/158 |
| 2004/0211218 | A1 * | 10/2004 | Jotaki | C03B 33/027 65/105 |
| 2006/0081673 | A1 | 4/2006 | Schenk et al. | |
| 2007/0023691 | A1 * | 2/2007 | Morishige | B23K 26/0613 250/492.1 |
| 2007/0048972 | A1 * | 3/2007 | Baylis | B28D 5/0011 438/460 |
| 2008/0014720 | A1 * | 1/2008 | Tyler | H01L 21/67092 438/462 |
| 2008/0196229 | A1 * | 8/2008 | Van Beuningen | B28D 5/0052 29/239 |
| 2009/0014425 | A1 * | 1/2009 | Zuehlke | C03B 33/033 219/121.72 |
| 2009/0014492 | A1 * | 1/2009 | Haase | B28D 5/0011 225/93.5 |
| 2009/0121337 | A1 * | 5/2009 | Abe | B23K 26/0057 257/686 |
| 2009/0302085 | A1 * | 12/2009 | Wetsch | B26F 3/002 225/93 |
| 2010/0163593 | A1 * | 7/2010 | Song | G02B 6/25 225/96 |
| 2010/0252601 | A1 * | 10/2010 | Thibault | B26F 3/002 225/106 |
| 2010/0317172 | A1 * | 12/2010 | Morikazu | B23K 26/0608 438/463 |
| 2011/0095062 | A1 * | 4/2011 | Maekawa | C03B 33/033 225/2 |
| 2012/0104064 | A1 * | 5/2012 | Nishikuma | B26F 3/002 225/1 |
| 2012/0234887 | A1 * | 9/2012 | Henley | H01L 21/67092 225/1 |
| 2012/0247658 | A1 * | 10/2012 | Kawada | C03B 33/0222 156/250 |
| 2013/0092669 | A1 * | 4/2013 | Morikazu | H01L 21/67092 219/121.67 |
| 2013/0181026 | A1 * | 7/2013 | Su | B26F 3/002 225/103 |
| 2013/0341372 | A1 * | 12/2013 | Lee | C03B 33/033 225/2 |
| 2015/0034691 | A1 * | 2/2015 | Takaichi | H02K 15/03 225/2 |
| 2015/0158197 | A1 * | 6/2015 | Takaichi | H02K 15/03 225/3 |
| 2016/0137543 | A1 * | 5/2016 | Abramov | C03B 33/0215 225/2 |
| 2016/0280578 | A1 * | 9/2016 | Yamamoto | C03B 33/033 |
| 2016/0280579 | A1 * | 9/2016 | Yamamoto | B28D 1/222 |
| 2017/0072593 | A1 * | 3/2017 | LaCroix | B28D 1/222 |
| 2017/0183250 | A1 * | 6/2017 | Soyama | C03B 33/033 |

FOREIGN PATENT DOCUMENTS

| | | |
|---|---|---|
| JP | 2006-117518 | 5/2006 |
| JP | 2009-95901 | 5/2009 |
| JP | 2011-231011 | 11/2011 |
| WO | WO 2012/108391 A1 | 8/2012 |

OTHER PUBLICATIONS

Written Opinion dated Jan. 20, 2015 in PCT/JP2014/083158, filed Dec. 15, 2014.

* cited by examiner

METHOD FOR PROCESSING BRITTLE PLATE, AND DEVICE FOR PROCESSING BRITTLE PLATE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2014/083158 filed on Dec. 15, 2014 and designating the U.S., which claims priority to Japanese Patent Application No. 2013-273331 filed on Dec. 27, 2013. The entire contents of the foregoing applications are incorporated herein by reference.

BACKGROUND OF THE INVENTION

1. Field of the Invention

The present invention relates to a method for processing a brittle plate, and a device for processing a brittle plate.

2. Description of the Related Art

A method for processing a brittle plate includes a cutting step and a breaking step (see, e.g., Japanese Laid-Open Patent Publication No. 2011-231011). The cutting step includes forming a score line on a surface of the brittle plate, and the breaking step includes breaking the brittle plate along the score line. An example of a brittle plate includes a glass plate.

Note that in the breaking step, a pressing member for pressing a surface of the brittle plate and a template, as a support member for supporting a back face of the brittle plate, are used. The template is arranged flat against one portion of the brittle plate to support the brittle plate, and the pressing member is pressed against a predetermined position of a remaining portion of the brittle plate. The brittle plate is bent and deformed at an outer edge of a supporting surface of the template as a bending fulcrum, and a stress is generated. Such stress causes the score line to open so that the brittle plate can be broken along the score line.

Conventionally, the score line is included within the portion of the brittle plate that is arranged flat against the template. In this way, a broken and cut surface that is substantially perpendicular to the surface of the brittle plate may be obtained.

However, because the breaking position of the brittle plate is supported by the template, it has been difficult to break the score line open. In this case, a tensile stress applied to the surface of the brittle plate and a compressive stress applied to the back face of the brittle plate when breaking the brittle plate tend to rapidly increase such that excessive stress is applied to cause chipping of the brittle plate.

SUMMARY OF THE INVENTION

According to one aspect of the present invention, a method for processing a brittle plate is provided that enables forming a broken and cut surface that is substantially perpendicular to the surface of the brittle plate and preventing chipping of the brittle plate as a result of breaking the brittle plate.

According to one embodiment of the present invention, a method for processing a brittle plate is provided that includes a breaking step in which a pressing member for pressing a surface of the brittle plate and a support member for supporting a back face of the brittle plate are used to bend and deform the brittle plate and break the brittle plate along a score line formed on the surface of the brittle plate. The support member includes a flat portion that is arranged flat against one portion of the brittle plate to support the brittle plate, and a regulating portion that regulates a bending deformation shape of the brittle plate when the pressing member is pressed against a predetermined position of a remaining portion of the brittle plate. The breaking step includes breaking the brittle plate along the score line that is within the remaining portion of the brittle plate by supporting the one portion of the brittle plate that is arranged flat against the flat portion and pressing the pressing member against the predetermined position of the remaining portion of the brittle plate.

DESCRIPTION OF EMBODIMENTS

Figure 1:
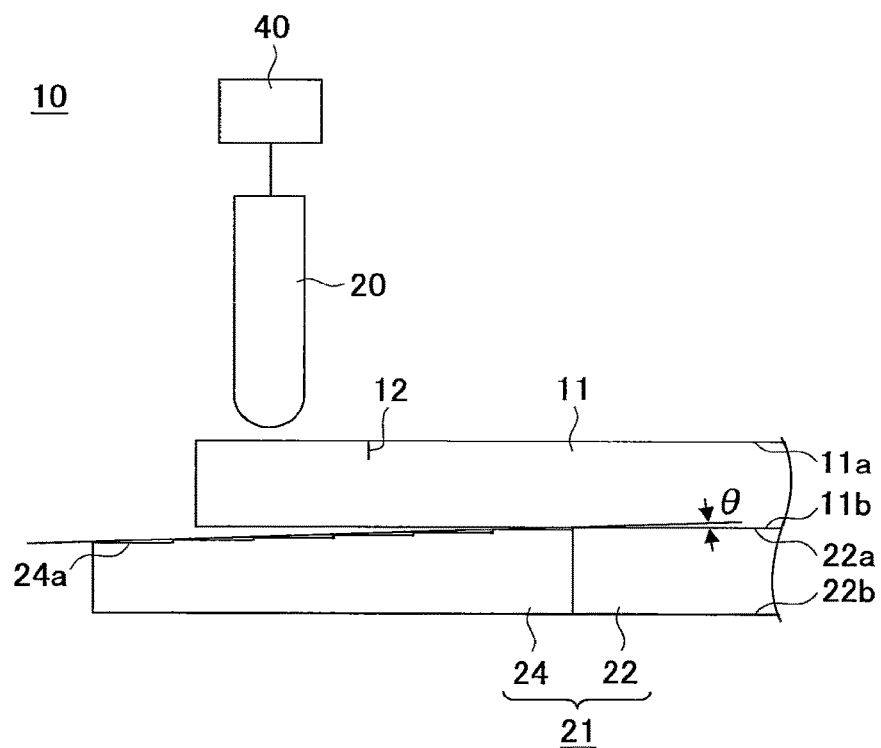
FIG. 1 is a diagram showing a device for processing a glass plate according to a first embodiment of the present invention before a pressing member is pressed.

In the following, embodiments of the present invention are described with reference to the accompanying drawings. Note that in the drawings, identical or corresponding features and elements are given the same or corresponding reference numerals and their descriptions may be omitted. Also, note that in the following descriptions, a numerical range described using the symbol "−" represents a range including the numerical values indicated in front of and behind the symbol.

First Embodiment

Figure 2:
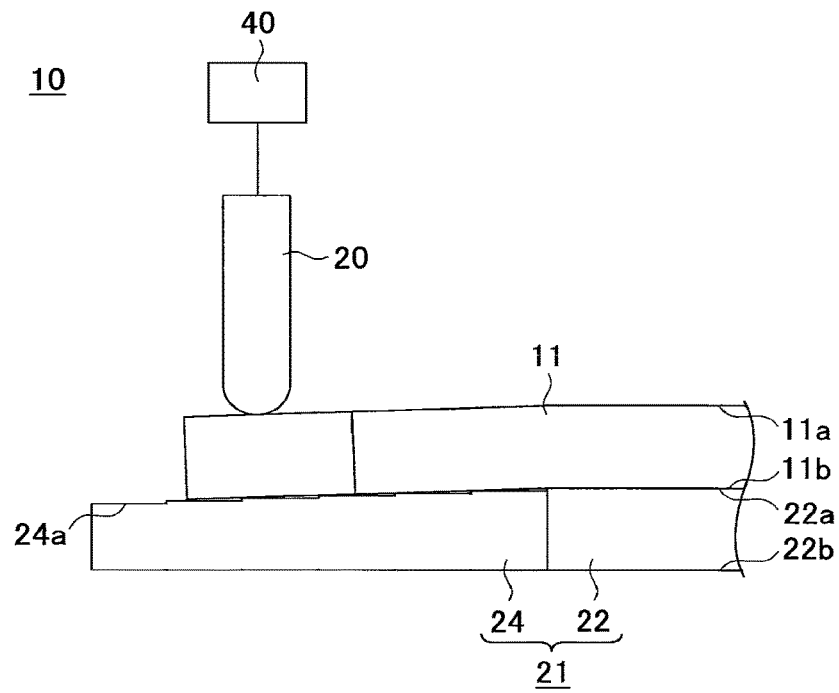
FIG. 2 is a diagram showing the device for processing a glass plate according to the first embodiment of the present invention when the pressing member is pressed.

FIG. 1 is a diagram showing a device for processing a glass plate according to a first embodiment of the present invention before a pressing member is pressed. FIG. 2 is a diagram showing the device for processing a glass plate according to the first embodiment of the present invention when the pressing member is pressed. Note that a glass plate 11 to be processed has a score line 12 formed on its surface 11a beforehand. The score line 12 is a crack having a predetermined depth from the surface 11a and may be formed using a cutter or a laser, for example.

The device 10 for processing a glass plate includes a pressing member 20 for pressing the surface 11a of the glass plate 11 and a template 21 as a support member for supporting a back face 11b of the glass plate 11. The device 10 for processing a glass plate bends and deforms the glass plate 11 to break the glass plate 11 along the score line 12.

The pressing member 20 presses the surface 11a of the glass plate 11 to bend and deform the glass plate 11. A plurality of the pressing members 20 may be arranged apart from one another along the score line 12. The pressing member 20 may be a pneumatic pressure cylinder, for example, and a pressing force exerted by the pressing member 20 may be controlled by a controller 40. The controller 40 includes a storage unit, such as a memory, and a CPU (Central Processing Unit), and is configured to control the pressing force exerted by the pressing member 20 by causing the CPU to execute a program stored in the storage unit.

The template 21 supports the back face 11b of the glass plate 11. The template 21 may be in contact with the back face 11b of the glass plate 11. However, the template 21 does not have to be in contact with the back face 11b of the glass plate 11 and may support the back face 11b of the glass plate 11 via an intermediate member. An example of the intermediate member includes a transport belt for transporting the glass plate 11.

The template 21 may support the back face 11b of the glass plate 11 by vacuum suction, or the template 21 may support the back face 11b of the glass plate 11 by friction, for example. Note that the method used by the template 21 to support the glass plate 11 is not particularly limited.

The template 21 includes a flat portion 22 and a regulating portion 24. The flat portion 22 has a flat surface 22a that is arranged flat against one portion of the glass plate 11 to support the glass plate 11. Note that a face 22b of the flat portion 22 opposing the flat surface 22a does not have to be a flat surface.

The regulating portion 24 regulates a bending deformation shape of the glass plate 11 when the pressing member 20 is pressed against a predetermined position of a remaining portion of the glass plate 11. Bending deformation of the glass plate 11 refers to the glass plate 11 bending and deforming at an outer edge of the flat surface 22a as a bending fulcrum.

By causing bending deformation of the glass plate 11, a tensile stress acts on the score line 12 that is included within the remaining portion of the glass plate 11, and in this way, the score line 12 may be opened and the glass plate 11 may be broken. Note that the score line 12 in the present embodiment is not included within the portion of the glass plate 11 supported by the flat portion 22 but is included within the remaining portion of the glass plate 11 that is bent and deformed into a bending deformation shape regulated by the regulating portion 24. Thus, the score line 12 may be easily opened, and a tensile stress applied to the surface 11a of the glass plate 11 and a compressive stress applied to the back face 11b of the glass plate 11 may increase at lower rates. In turn, the glass plate 11 may be broken with minimal stress and chipping of the glass plate 11 may be suppressed. Also, in the present embodiment, the bending deformation of the glass plate 11 is regulated by the regulating portion 24, and in this way, a broken and cut surface that is substantially perpendicular to the surface 11a of the glass plate 11 may be obtained. In a preferred embodiment, at least a portion of the score line 12 may be included in a portion of the glass plate 11 that is supported by the regulating portion 24 when the pressing member 20 is pressed, and the score line 12 may overlap the regulating portion 24 when viewed from a direction perpendicular to the flat surface 22a. In this way, the above-mentioned effects may be more easily achieved.

The regulating portion 24 includes a regulating face 24a that does not support the back face 11b of the glass plate 11 before the pressing member 20 is pressed but supports the back face 11b of the glass plate 11 when the pressing member is pressed against the glass plate 11. The bending deformation shape of the glass plates is regulated by the shape of the regulating face 24a.

The regulating face 24a is disposed at a distance below a plane including the flat surface 22a at a distance as shown in FIG. 1. The regulating face 24a may have a stepped shape. The template 21 may be fabricated by laterally arranging a plurality of blocks having differing heights, for example. Alternatively, the template 21 may be fabricated by vertically stacking a plurality of plates in different sizes, for example. In either case, the cost for fabricating the template 21 may be relatively low. Note that in some embodiments, the shape of the regulating face 24a may be arranged into a gentle slope, for example. That is, the regulating face 24a may be arranged into any suitable shape as long as a space is secured between the glass plate 11 and the regulating face 24a before the pressing member 20 is pressed.

An inclination angle $\theta$ of the regulating face 24a with respect to the flat surface 22a may be 0.3°-5°, for example. Note that the inclination angle $\theta$ refers to an angle formed between the flat surface 22a and a straight line passing through the outer edge of the flat surface 22a and an outer edge of the regulating face 24a on a cross-sectional plane that is perpendicular to the outer edge of the flat surface 22a. When the inclination angle $\theta$ is greater than or equal to 0.3°, a tensile stress that acts on the score line 12 may be adequately generated without unnecessarily enlarging the template 21. Also, when the inclination angle $\theta$ is less than or equal to 5°, the regulating face 24a may have an adequate width for accommodating various shapes of the glass plate 11, and a broken and cut surface that is substantially perpendicular to the surface 11a of the glass plate 11 may be formed. The inclination angle $\theta$ is preferably greater than or equal to 0.5° and less than or equal to 4°.

Figure 3:
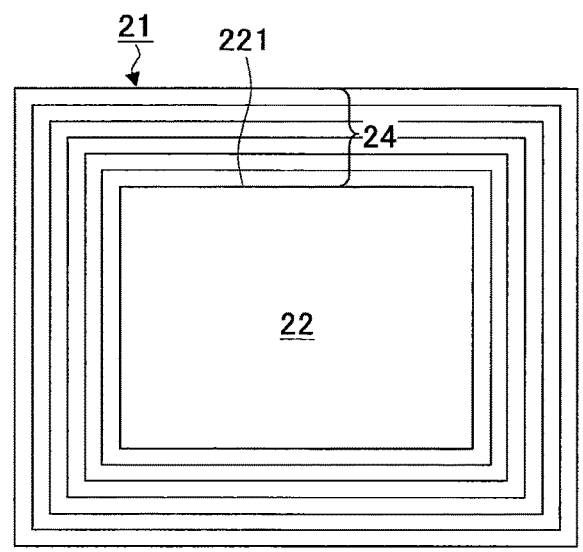
FIG. 3 is a plan view showing a template according to the first embodiment of the present invention.

FIG. 3 is a plan view showing the template according to the first embodiment of the present invention. As shown in FIG. 3, the regulating portion 24 may surround the outer edge of the flat portion 22. Note that one template 21 may be able to accommodate a plurality of different score lines 12 defining different shapes, for example. The plurality of different score lines 12 may be different score lines defining shapes of about the same size. For example, the different score lines 12 may be score lines for glass windows to be mounted at the same position for different car models (e.g. windshields for different car models).

Figure 4:
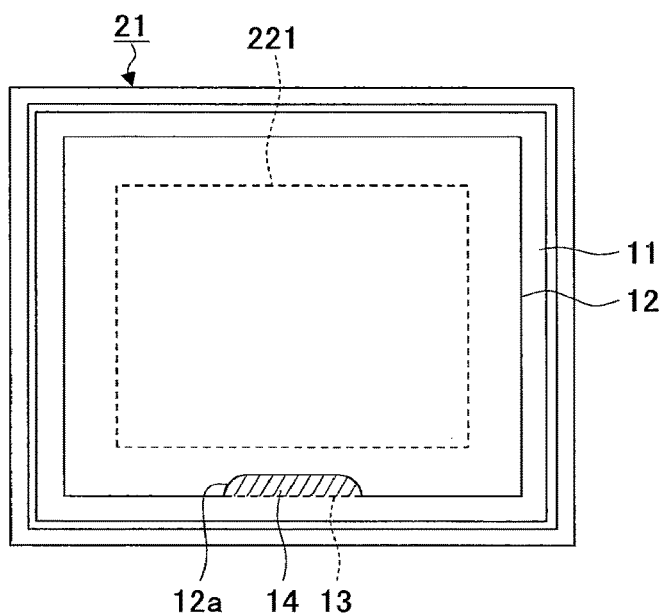
FIG. 4 is a plan view showing a positional relationship between the template of FIG. 3 and a score line.

FIG. 4 is a plan view showing a positional relationship between the template shown in FIG. 3 and the score line. In FIG. 4, the outer edge 221 of the flat surface 22a is indicated by a broken line.

In FIG. 4, the score line 12 is closed, and a product is to be extracted from the inner side of the score line 12. The score line 12 may include a recessed portion 12a that is recessed inward. Such a recessed portion 12a is commonly referred to as "inside curve". The glass plate 11 includes a removal portion 14 (hatched portion with left-downward sloping lines in FIG. 4) that is surrounded by the recessed portion 12a and a straight line 13 connecting the two ends of the recessed portion 12a. The removal portion 14 is removed after breaking the glass plate 11 and does not form a part of the product.

Note that although the score line 12 in the present embodiment is closed in plan view, the score line 12 does not have to be closed. Also, the recessed portion 12a of the score line 12, in plan view, may be defined by any line that is recessed toward the flat portion 22.

According to the present embodiment, as described above, the load applied to the glass plate 11 when breaking the glass plate 11 may be reduced. In this way, when breaking away the removal portion 14 by dividing the removal portion 14 into a plurality of regions, the number of score lines that have to be formed for defining the plurality of regions may be reduced, for example. Also, the removal portion 14 may be removed without dividing the removal portion 14 into a plurality of regions, for example.

As shown in FIG. 4, in the present embodiment, the outer edge 221 of the flat surface 22a may include at least one of a straight line portion and a curved line portion curving outward (only straight line portions are included in FIG. 4) but does not include a curved line portion curving inward. That is, the outer edge 221 of the flat surface 22a does not include a recessed portion that is recessed inward.

Figure 5:
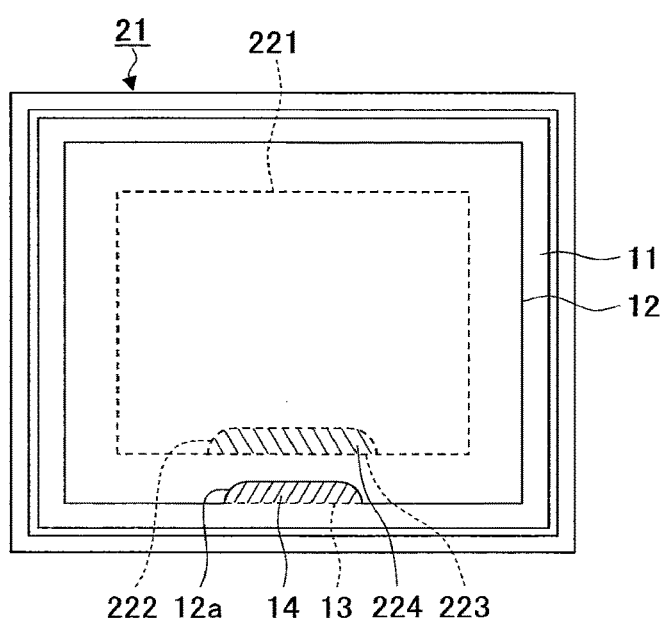
FIG. 5 is a plan view showing a positional relationship between a template according to a modified example and a score line.

FIG. 5 is a plan view showing a positional relationship between a template according to a modified example and the score line. In FIG. 5, the outer edge 221 of the flat surface 22a is indicated by a broken line.

In FIG. 5, the outer edge 221 of the flat surface 22a may include a recessed portion 222 that is recessed inward. In this case, there may be a region 224 of the glass plate 11 above the regulating portion 24 where bending deformation is difficult (hatched region with right-downward sloping lines in FIG. 5). The region 224 is surrounded by the recessed portion 222 and a straight 223 connecting the two ends of the recessed portion 222.

As shown in FIG. 4, when the outer edge 221 of the flat surface 22a does not include the recessed portion 222 (see FIG. 5), the glass plate 11 does not include a region 224 above the regulating portion 24 where bending deformation is difficult (see FIG. 5). Thus, the load to be applied to the glass plate 11 when breaking the glass plate 11 can be reduced.

Meanwhile, as shown in FIG. 5, when the outer edge 221 of the flat surface 22a includes the recessed portion 222, the region 224 of the glass plate 11 where bending deformation is difficult does not overlap the score line 12. Thus, the load to be applied to the glass plate 11 when breaking the glass plate 11 can be reduced as in the case where the outer edge 221 of the flat surface 22a does not include the recessed portion 222.

Note that although the score line 12 shown in FIG. 4 includes the recessed portion 12a that is recessed inward, the score line 12 does not have to include the recessed portion 12a. In this case, the outer edge 221 of the flat surface 22a does not include the recessed portion 222, and as such, the glass plate 11 does not include a region 244 above the regulating portion 24 where bending deformation is difficult. Thus, the load to be applied to the glass plate 11 when breaking the glass plate 11 may be reduced.

Similarly, although the score line 12 shown in FIG. 5 includes the recessed portion 12a that is recessed inward, the score line 12 does not have to include the recessed portion 12a. In this case, the outer edge 221 of the flat surface 22a includes the recessed portion 222, but the region 224 of the glass plate 11 where bending deformation is difficult does not overlap the score line 12. Thus, the load to be applied to the glass plate 11 when breaking the glass plate 11 may be reduced.

In the following, referring back to FIGS. 1 and 2, a method for processing a glass plate using the above-described device 10 for processing a glass plate is described. The method for processing a glass plate according to the present embodiment includes a breaking step that involves using the pressing member 20 for pressing the surface 11a of the glass plate 11 and the template 21 for supporting the back face 11b of the glass plate 11 to bend and deform the glass plate 11 and thereby break the glass plate 11 along the score line 12 formed on the surface 11a of the glass plate 11.

In the breaking step, one portion of the glass plate 11 is supported by the flat portion 22, and a predetermined position of a remaining portion of the glass plate 11 is pressed by the pressing member 20. The pressing force exerted by the pressing member 20 causes bending deformation of the glass plate 11 at the outer edge 221 of the flat surface 22a as a bending fulcrum. The bending deformation of the glass plate 11 is regulated by the regulating portion 24.

The bending deformation of the glass plate 11 causes a tensile stress to act on the score line 12 that is included within the remaining portion of the glass plate 11, and in this way, the score line 12 may be opened and the glass plate 11 may be broken. Note that the score line 12 in the present embodiment is not included within the portion of the glass plate 11 that is supported by the flat portion 22 but is included within the remaining portion of the glass plate 11 that is bent and deformed into a bending deformation shape regulated by the regulating portion 24. Thus, the score line 12 may be easily opened, the load to be applied to the glass plate 11 may be reduced, and chipping of the glass plate 11 may be suppressed. Also, according to the present embodiment, the bending deformation of the glass plate 11 is regulated by the regulating portion 24, and in this way, a broken and cut surface that is substantially perpendicular to the surface 11a of the glass plate 11 may be obtained.

Also, as shown in FIGS. 1 and 2, at least one pressing member 20 is arranged to press a portion of the surface 11a of the glass plate 11 on the opposite side of the flat portion 22 with respect to the score line 12 (portion on the left side of the score line 12 in FIGS. 1 and 2). In this way, a tensile stress acts on the score line 12 to facilitate opening of the score line 12.

Also, at least one pressing member 20 may be arranged to press the score line 12. In this case, a compressive stress acts on the score line 12. In this way, a stress applied to the glass plate 11 may be adjusted at each location of the score line 12, and the extension of a crack can be adjusted.

Second Embodiment

Figure 6:
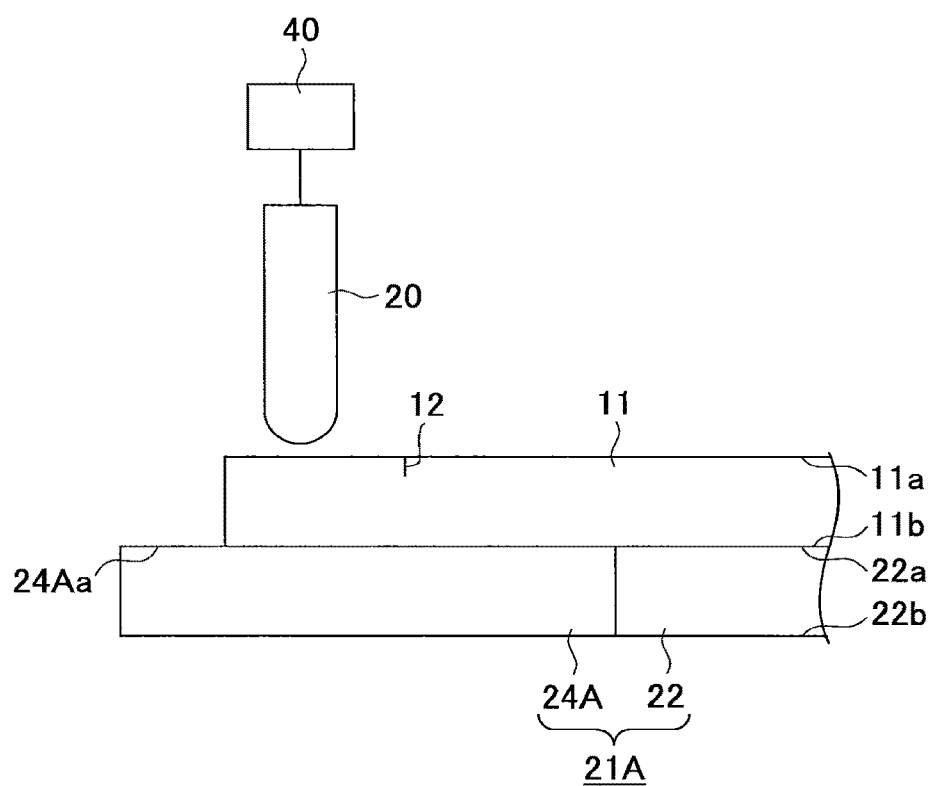
FIG. 6 is a diagram showing a device for processing a glass plate according to a second embodiment of the present invention before the pressing member is pressed.
Figure 7:
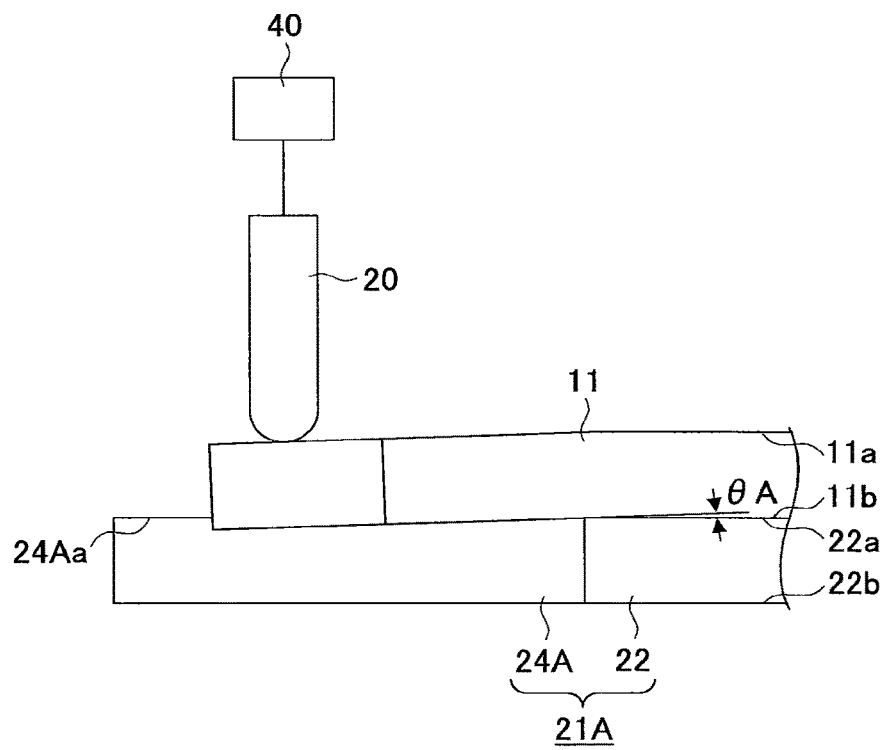
FIG. 7 is a diagram showing the device for processing a glass plate according to the second embodiment of the present invention when the pressing member is pressed.

FIG. 6 is a diagram showing a device for processing a glass plate according to a second embodiment of the present invention before the pressing member is pressed. FIG. 7 is a diagram showing a device for processing a glass plate according to the second embodiment of the present invention when the pressing member is pressed.

A template 21A according to the present embodiment includes a regulating portion 24A instead of the regulating portion 24 as shown in FIGS. 1 and 2. The regulating portion 24A regulates a bending deformation shape of the glass plate 11 when the pressing member 20 is pressed against a predetermined position of the glass plate 11. Bending deformation of the glass plate 11 refers to the glass plate 11 bending and deforming at the outer edge of the flat surface 22a as the bending fulcrum.

By causing bending deformation of the glass plate 11, a tensile stress acts on the score line 12 that is included in the remaining portion of the glass plate 11, and in this way the score line 12 may be opened and the glass plate 11 may be broken. Note that the score line 12 in the present embodiment is not included within the portion of the glass plate 11 that is supported by the flat portion 22 but is included within the remaining portion of the glass plate 11 that is bent and deformed into a bending deformation shape regulated by the regulating portion 24A. Thus, the score line 12 may be easily opened, the load to be applied to the glass plate 11 may be reduced, and chipping of the glass plate 11 may be suppressed. Also, according to the present embodiment, the bending deformation of the glass plate 11 is regulated by the regulating portion 24A, and in this way, a broken and cut surface that is substantially perpendicular to the surface 11a of the glass plate 11 may be obtained.

The regulating portion 24A undergoes elastic deformation according to the pressing force exerted by the pressing member 20 and thereby regulates the bending deformation shape of the glass plate 11. When the pressing force of the pressing member 20 is removed, the regulating portion 24A returns to its original shape. Before being pressed by the pressing member 20, a regulating face 24Aa of the regulating portion 24A may be flush with the flat surface 22a and may support the back face 11b of the glass plate 11. That is, the entire back face 11b of the glass plate 11 may be supported by the template 21A.

When the pressing member 20 is pressed against the glass plate 11, an inclination angle θA of a bent and deformed portion of the glass plate 11 with respect to the flat surface 22a may be 0.3°-5°, for example. When the inclination angle θA is greater than or equal to 0.3°, a tensile stress may that acts on the score line 12 may be adequately generated at the rear side of the advancing direction of the pressing member 20. Also, when the inclination angle θA is less than or equal to 5°, a broken and cut surface that is substantially perpendicular to the surface 11a of the glass plate 11 may be formed. The inclination angle θA is preferably greater than or equal to 0.5° and less than or equal to 4°. A suitable material may be selected for the regulating portion 24A such that the inclination angle θA may be within the above range.

EXAMPLES

Figure 8:
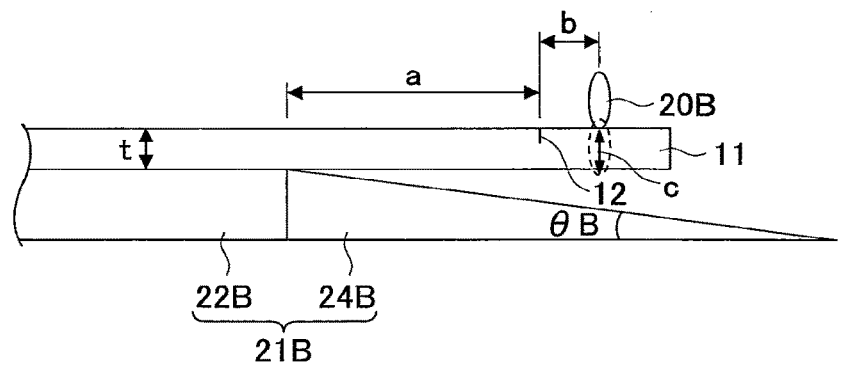
FIG. 8 is a diagram showing a method for processing a glass plate according to Examples 1 to 6.

FIG. 8 is a diagram showing a method for processing a glass plate according to Examples 1 to 6. In FIG. 8, a position of a pressing member 20B at the time the pressing member 20B is completely pressed down is indicated by a dotted line.

In Examples 1 to 6, the pressing member 20B for pressing the surface of the glass plate 11, and a template 21B for supporting the back face of the glass plate 11 were used to bend and deform the glass plate 11 and thereby break the glass plate 11 along the score line 12 formed on the surface of the glass plate 11. The template 21B includes a flat portion 22B and a regulating portion 24B, and a regulating face of the regulating portion 24B is gently inclined with respect to the flat surface of the flat portion 22B. The score line 12 was arranged to be parallel to one side of a rectangular glass plate 11 and was formed from one end to another end of the glass plate 11. The score line 12 was not included within the portion of the glass plate 11 supported by the flat portion 22B but was included within the remaining portion of the glass plate 11 that was bent and deformed into a bending deformation shape regulated by the regulating portion 24B.

In Examples 1 to 6, aside from the conditions indicated in Table 1 shown below, the same conditions were used to break the glass plate 11. Note that "θB" represents the inclination angle of the regulating face of the regulating portion 24B with respect to the flat surface of the flat portion 22B, "a" represents the horizontal distance from the outer edge of the flat surface of the flat portion 22B to the score line 12, "b" represents the horizontal distance from the score line 12 to a pressing position, "c" represents the amount the pressing member 20B has been depressed from the time the pressing member 20B came into contact with the upper surface of the glass plate 11 in its natural state, and "t" represents the thickness of the glass plate 11.

Figure 9:
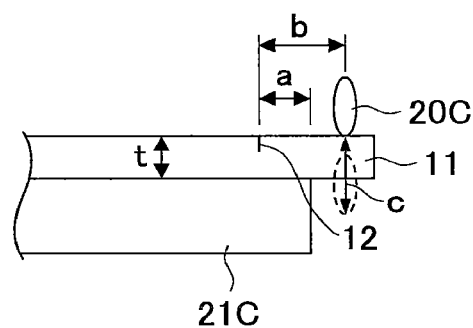
FIG. 9 is a diagram showing a method for processing a glass plate according to Comparative Examples 1 and 2.

FIG. 9 is a diagram showing a method for processing a glass plate according to Comparative Examples 1 and 2. In FIG. 9, a position of a pressing member 20C at the time the pressing member 20C is completely pressed down is indicated by a dotted line.

In Comparative Examples 1 and 2, the pressing member 20C for pressing the surface of the glass plate 11 and a template 21C for supporting the back face of the glass plate 11 were used to bend and deform the glass plate 11 and thereby break the glass plate 11 along the score line 12 formed on the surface of the glass plate 11. In Comparative Examples 1 and 2, aside from the conditions that the template 21C that only has a flat portion was used and the score line 12 was included within the portion of the glass plate 11 supported by the template 21C, the same conditions as those of Examples 1 to 6 were used to break the glass plate 11.

The varying conditions and results of breaking the glass plate 11 according to the above examples are indicated in Table 1 shown below. Evaluations of whether chipping occurred as a result of breaking the glass plate 11 are indicated as the results.

TABLE 1

| | θB (°) | a (mm) | b (mm) | c (mm) | t (mm) | CHIPPING |
|---|---|---|---|---|---|---|
| EXAMPLE 1 | 0.3 | 85.5 | 10 | 0.5 | 1.3 | NO |
| EXAMPLE 2 | 0.5 | 47.3 | 10 | 0.5 | 1.3 | NO |
| EXAMPLE 3 | 0.75 | 28.2 | 10 | 0.5 | 2 | NO |
| EXAMPLE 4 | 1.15 | 14.9 | 10 | 0.5 | 5 | NO |
| EXAMPLE 5 | 4.8 | 9.1 | 10 | 1.6 | 2 | NO |
| EXAMPLE 6 | 5 | 8.3 | 10 | 1.6 | 2 | NO |
| COMPARATIVE EXAMPLE 1 | — | 100 | 10 | 8.3 | 1.3 | YES |
| COMPARATIVE EXAMPLE 2 | — | 100 | 10 | 9.1 | 1.3 | YES |

As can be appreciated from Table 1, in Examples 1 to 6, because the inclination angle θB was within the range of 0.3°-5°, and the score line 12 was included within the remaining portion of the glass plate 11 that was bent and deformed into a bending deformation shape regulated by the regulating portion 24B, no chipping occurred as a result of breaking the glass plate 11. On the other hand, in Comparative Examples 1 and 2, because the score line 12 was included within the portion of the glass plate 11 supported by the template 21C, chipping occurred as a result of breaking the glass plate 11. The chipping occurred on the back face of the glass plate 11.

Although illustrative embodiments of a device and a method for processing a glass plate as an example of a brittle plate have been described above, the present invention is not limited to the embodiments described above, and various changes, modifications, and improvements may be made within the scope of the present invention.

For example, although a glass plate is described above as an example of a brittle plate, other examples include a metal silicon plate, a ceramic plate, and the like.

What is claimed is:
1. A method for processing a brittle plate, the method comprising:

a breaking step that includes using a pressing member for pressing a surface of the brittle plate and a support member for supporting a back face of the brittle plate to bend and deform the brittle plate and break the brittle plate along a score line formed on the surface of the brittle plate;

wherein the support member includes a flat portion that is arranged flat against one portion of the brittle plate to support the brittle plate, and a regulating portion that regulates a bending deformation shape of the brittle plate when the pressing member is pressed against a predetermined position of a remaining portion of the brittle plate; and wherein the breaking step includes breaking the brittle plate along the score line that is within the remaining portion of the brittle plate by supporting the one portion of the brittle plate that is arranged flat against the flat portion and pressing the pressing member against the predetermined position of the remaining portion of the brittle plate.

2. The method for processing a brittle plate according to claim 1, wherein
at least a part of the score line is included within a portion of the brittle plate that is supported by the regulating portion when the pressing member is pressed against the brittle plate.

3. The method for processing a brittle plate according to claim 1, wherein
the regulating portion includes a regulating face that does not support the back face of the brittle plate before the pressing member is pressed against the brittle plate but supports the back face of the brittle plate when the pressing member is pressed against the brittle plate, and the regulating portion regulates the bending deformation shape of the brittle plate according to a shape of the regulating face.

4. The method for processing a brittle plate according to claim 3, wherein
an inclination angle of the regulating face with respect to a flat surface of the flat portion that supports the brittle plate is from 0.3° to 5°.

5. The method for processing a brittle plate according to claim 1, wherein
the regulating portion regulates the bending deformation shape of the brittle plate by undergoing elastic deformation according to a pressing force exerted by the pressing member.

6. The method for processing a brittle plate according to claim 1, wherein
the score line includes a recessed portion that is recessed toward the flat portion in plan view.

7. The method for processing a brittle plate according to claim 1, wherein
an outer edge of a flat surface of the flat portion that supports the brittle plate does not include a recessed portion that is recessed inward.

8. The method for processing a brittle plate according to claim 1, wherein
an outer edge of a flat surface of the flat portion that supports the brittle plate includes a recessed portion that is recessed inward; and
the score line, in plan view, does not overlap a region surrounded by the recessed portion of the outer edge and a straight line connecting two ends of the recessed portion of the outer edge.

9. The method for processing a brittle plate according to claim 1, wherein
the regulating portion surrounds an outer edge of the flat portion.

10. A device for processing a brittle plate, the device comprising:
a pressing member for pressing a surface of the brittle plate; and
a support member for supporting a back face of the brittle plate;
wherein the pressing member and the support member are used to bend and deform the brittle plate and break the brittle plate along a score line formed on the surface of the brittle plate;
wherein the support member includes a flat portion that is arranged flat against one portion of the brittle plate to support the brittle plate, and a regulating portion that regulates a bending deformation shape of the brittle plate when the pressing member is pressed against a predetermined position of a remaining portion of the brittle plate; and
wherein the device breaks the brittle plate along the score line that is within the remaining portion of the brittle plate.

11. The device for processing a brittle plate according to claim 10, wherein
the regulating portion includes a regulating face that does not support the back face of the brittle plate before the pressing member is pressed against the brittle plate but supports the back face of the brittle plate when the pressing member is pressed against the brittle plate, and the regulating portion regulates the bending deformation shape of the brittle plate according to a shape of the regulating face.

12. The device for processing a brittle plate according to claim 11, wherein
an inclination angle of the regulating face with respect to a flat surface of the flat portion that supports the brittle plate is from 0.3° to 5°.

13. The device for processing a brittle plate according to claim 10, wherein
the regulating portion regulates the bending deformation shape of the brittle plate by undergoing elastic deformation according to a pressing force exerted by the pressing member.

14. The device for processing a brittle plate according to claim 10, wherein
an outer edge of a flat surface of the flat portion that supports the brittle plate does not include a recessed portion that is recessed inward.

15. The device for processing a brittle plate according to claim 10, wherein
the regulating portion surrounds an outer edge of the flat portion.

* * * * *